May 3, 1966  R. R. WAREHAM  3,249,029
PHOTOGRAPHIC PRINT-CONTAINING DEVICE
Filed Oct. 19, 1962  2 Sheets-Sheet 1

Richard R. Wareham
INVENTOR

BY Brown and Mikulka
ATTORNEYS

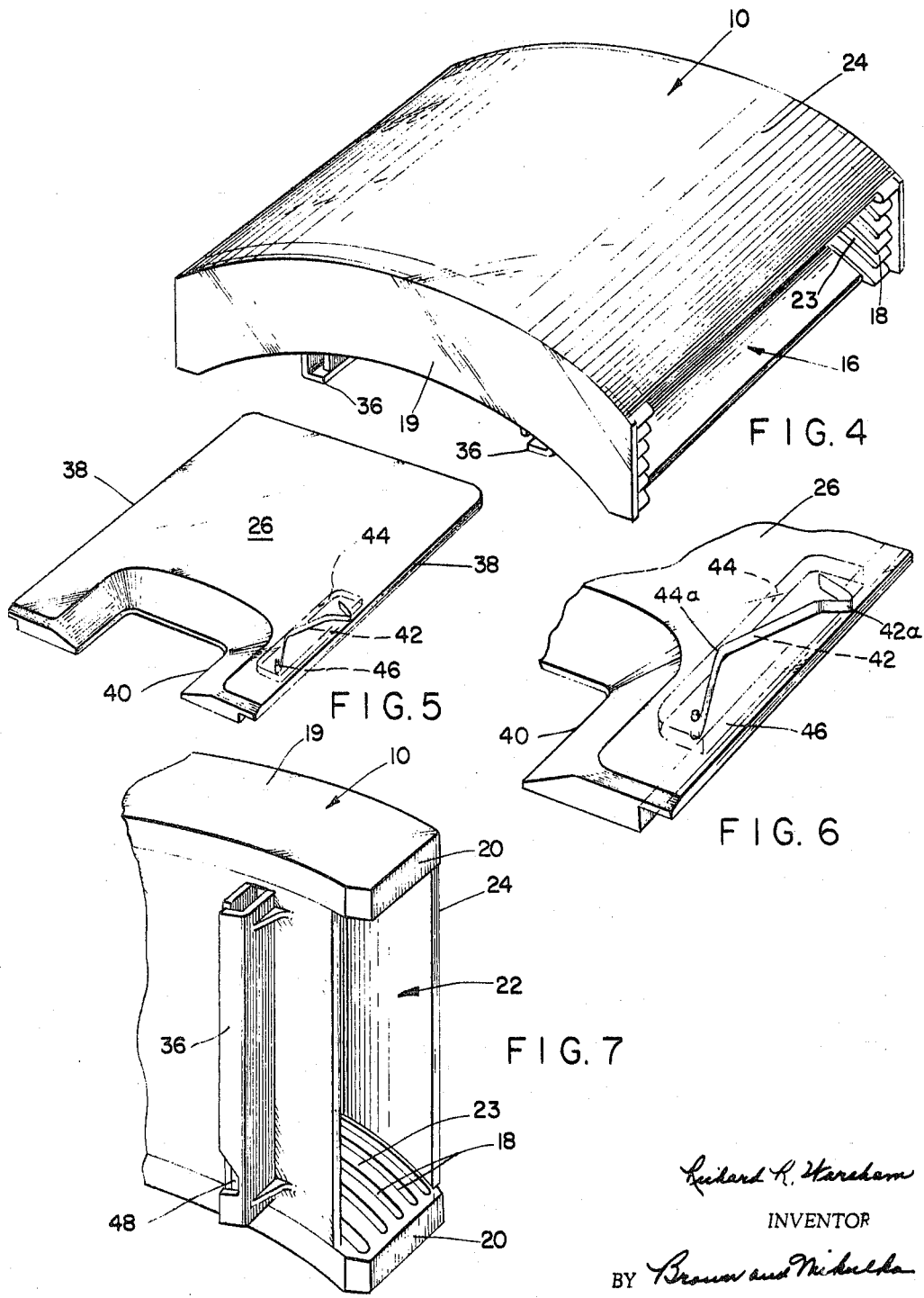

United States Patent Office 3,249,029
Patented May 3, 1966

3,249,029
PHOTOGRAPHIC PRINT-CONTAINING DEVICE
Richard R. Wareham, Marblehead, Mass., assignor to Polaroid Corporation, Cambridge, Mass., a corporation of Delaware
Filed Oct. 19, 1962, Ser. No. 231,649
12 Claims. (Cl. 95—12)

This invention relates to a photographic print-containing device for conveniently and systematically holding, in spaced relation, a plurality of photographic prints which have been exposed and processed in a camera adapted to produce a finished print, such as a camera of the type sold by Polaroid Corporation, Cambridge, Mass. The print-containing device is primarily intended for use in the field in association with the aforesaid camera rather than as a permanent storage means.

In a camera of the aforementioned category, which may be termed a self-processing or self-developing camera, photographic film units or areas are successively exposed and may immediately thereafter be processed to provide, by a diffusion transfer operation, a succession of positive prints. Among obvious advantages of such a system of photography, the operator is permitted to see, at once and directly, from each completed print what adjustments may be necessary in making the next exposure. Inasmuch as the image-bearing surface of each print is moist and somewhat tacky for a brief period after processing or after the subsequent application of a stabilizing substance, it is necessary to place the print where the aforesaid surface will be free from contact with any other object or with another print. It is also desirable to guard the print surface against the settling of dust or other foreign matter thereon.

A further factor is the usual requirement, in cameras of the aforementioned type, of commencing the processing of an exposed film area before a second film area can be exposed and, advisably, of completing the processing before a third film area is exposed, because too long a processing time can impair the quality of the print. It will be apparent, from the aforesaid considerations, that to achieve any appreciable rapidity of exposures, a proper and conveniently accessible environment for placement of each processed print, immediately after its processing, is not only generally to be desired but practically imperative where more than two successive exposures are to be performed. It will further be evident that such an environment, as provided through the intermediary of a proper print-containing device, should be close-at-hand to the operator, that is, in immediate proximity to the camera, and that the last-taken print should be visible to the operator so as to be available for checkup relative to the next exposure.

With these and other considerations in mind, objects of the invention are: to provide a photographic print-containing device, in the form of a compact protective enclosure for readily accepting and holding in spaced relation a plurality of recently exposed and processed prints; to provide a print container having a plurality of grooves or channels at two opposite sides for slidably receiving the marginal, non-image-carrying areas, only, of the prints; to provide a print container, as described having a transparent outer wall in which the prints may be placed in a given orderly arrangement and in which the last processed print is visible to the operator through the outer wall; to provide a print container of the aforesaid type having a pair of relatively large apertures for the flow of air therethrough to facilitate rapid drying of the print surfaces; to provide a print-containing device of the character described and a mounting bracket therefor, the mounting bracket being attached to the back of a camera in which each print has been successively exposed and processed and the print-containing device being slidably and releasably mounted on the mounting bracket; to provide a print-containing device, as described, which is so slidably mounted on the camera as to permit unimpeded use of the camera finder at one position and to facilitate the release and opening of a door in the camera back for removal of a finished print at another position; and to provide a mounting means or bracket for optionally holding or releasing the print container relative to the camera, the mounting means being transparent to enable the reading of camera instructional data therethrough.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a diagrammatic perspective view of the print container mounting plate; and FIGS. 5 through 7 are diagrammatic fragmentary views of structure for slidably mounting the print-containing device on a camera including associated latch means for holding it at mounted position and releasing it therefrom.

Figure 1:
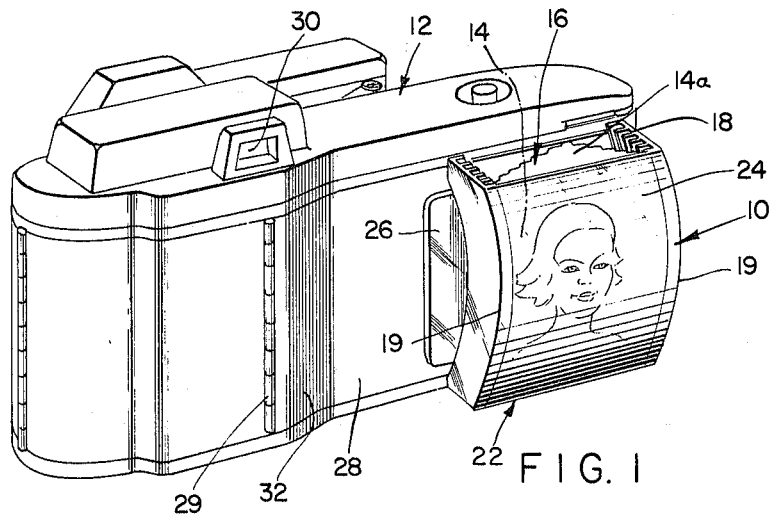
FIGURE 1 is a diagrammatic perspective view of the print-containing device mounted on a camera and containing a completed photographic print. The container is located at a first position which most conveniently permits the camera to be used for making an exposure.

Referring to FIGURE 1, the print-containing device 10 of the present invention is shown mounted on a camera 12 of the character described, namely, a camera which is capable of delivering a finished print within a few seconds after the exposure. A completed print 14 has been inserted in the container through an access aperture 16 at one end thereof so as to enter a pair of curved matching grooves or channels 18 at each of the opposite side members 19 of the container. The channels terminate at each of the side members 19 in closure means 20 providing a wall or barrier at their extremities which serves as a limit stop for determining the maximum insertion of the print. However, at the end of the container at which is located the wall portion 20 and extending laterally between said portions is a second opening 22. Accordingly, air is permitted, and in some measure induced, to circulate freely through the container between apertures 16 and 22 to facilitate drying of the print surface which may be somewhat tacky after processing.

The number of pairs of channels 18 included in the print container depends upon the factors of the desired print capacity, compactness desired and the proper utilization of the print-receiving channels to obtain maximum storage capacity, as described below. As more clearly shown in FIG. 3, five pairs of channels are included in the example, although, as stated, the number is flexible. The channels at each side of the container are formed by a plurality of parallel ribs or shoulders 23 extending along the inner faces of the side members 19. They are spaced at a constant distance from one another throughout their length so that when several prints are placed in the container they are held in substantially parallel relation.

The processed print is clearly visible through the outer or upper transparent container wall member 24 and, characteristically, has a tab 14a extending beyond aperture 16 which is used for manual insertion or removal of the print. The inner or lower wall member 25 of the container is preferably, although not necessarily, transparent also. The bowed upper and lower and curved side wall members of the print container are, appropriately, formed of individual elements, such as extrusions of a clear plastic material, e.g., a clear polystyrene. They are fitted and bonded together to produce the completed container 10 by a suitable adhesive such as ethylene dichloride, the completed container being of a rectangular contour and of a relatively shallow depth. The print container is slidably mounted on a mounting plate or bracket 26, the latter being fixedly attached, as by any suitable transparent adhesive, to a door 28 leading to a processing chamber of the camera, it being understood that the mounting bracket may properly be considered as an integral part of the camera. On the other hand, it could be detachably fastened thereto. The door 28 is pivotally attached to the camera body by a hinge 29. The mounting bracket 26, similarly formed of a clear plastic such as polystyrene, being transparent, permits viewing certain instructional data relating to operation of the camera which is printed on the surface of the door 28.

Figure 2:
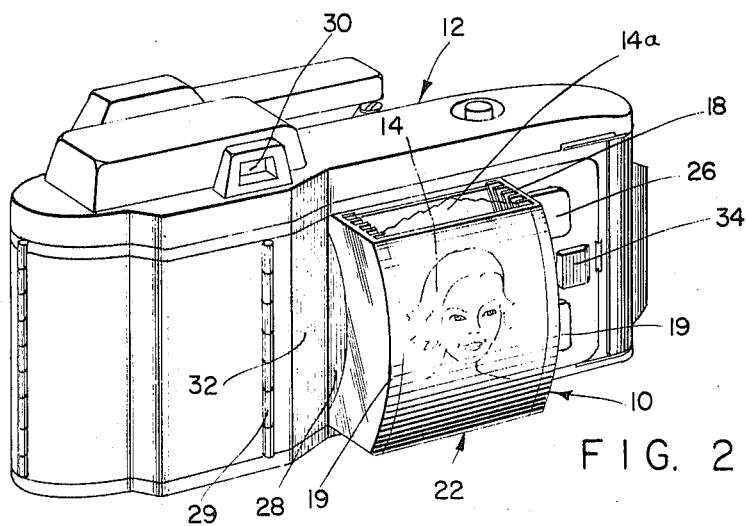
FIG. 2 is a view similar to FIGURE 1 but with the print container located at a second position which permits opening the camera back to remove a processed print.

The location to which the print container 10 has been slidably moved on its mounting plate 26, as shown in FIG. 1, is that at which an exposure can be made without the print container interfering with the operator's use of the camera finder 30, that is, without the container being in the way of some portion of the operator's face, e.g., the operator's nose. In FIG. 2, the print container is shown after it has been slidably moved to a location limited by its contact with the rearwardly extending camera wall portion 32 which constitutes a limit stop in this direction. At this location access is provided to the latch or locking button 34. The latch means 34, when released, permits opening of the door 28 to remove a print, which has just undergone processing, from the processing chamber of the camera.

The structure for slidably mounting the print container 10 on the mounting plate 26 is shown in greater detail in FIGS. 4 through 7. Two composite, raised, elongated and slotted elements 36, open at both ends, are formed integral with the under surface of the print container so as to extend thereacross in a direction at 90° to that of the channels 18. The associated mounting plate 26 is provided, along two sides, with a pair of elongated flanges 38 extending outwardly from two sides of the plate and serving as tracks for engagement by the slots or channels of the aforesaid elements 36 of the print container. The flanges or tracks 38, in the example shown, are actually outwardly extending portions of the plate itself in the manner of tongues, but of a lesser thickness than the main body thereof. The recessed portion or groove 40 of the mounting plate is so cut away as to permit complete exposure of the latch means 34 of the camera without requiring any shortening of the entire plate and, accordingly, of the flanges 38 to uncover the latch. This insures a length of the flanges sufficient to positively engage the slots of elements 36 of the print container at all positions, such as at opposite extremes of the container's movement to either of the locations shown in FIGS. 1 and 2.

A detent 42, in the form of a bowed, flat spring element, is mounted in a recessed area 44 of the mounting plate 26 contiguous with a flange 38. The detent is attached at one end to plate 26 by a stud or pin 46 and bears against a side of the recessed area at 44a so that the functional extremity 42a of the detent projects outwardly, when unrestrained, from the plate 26 immediately beneath the flange 38. The detent pivots at the point 44a and its pivotal movement is in a plane parallel with but slightly underneath the plane in which the flanges 38 lie. The detent 42 is adapted to engage an indention 48 formed in a lower member of each of the slotted elements 36 of the print container when the latter has been slidably moved to the location shown in FIG. 1. As previously stated, this is the correct position of the print container when the finder 30 is being used prior to making an exposure. With the detent 42 in the indention 48, the print container is locked against further movement in the direction just described, that is, movement beyond the extremities of flanges 38, and is therefore prevented from being removed from the camera. The elastic properties of the spring detent 42 are so chosen, however, that a rapid movement of the print container along its tracks in the direction toward the end of the camera permits its continued movement so that it can be completely removed from the camera, the inertia of the detent spring being such as to prevent its entering the indention 48 before the latter has passed beyond the detent tip 42a. Thus, to recapitulate, a slow or normal movement of the print container is a direction toward the extremities of the tracks 38 at the end of the camera nearest to the latch means 34 terminates in its being halted by the detent means 42a which enters the indention 48, the detent and indention operating together to constitute a limit stop. A rapid movement of the print container in the aforesaid direction, however, causes the indention to slip by the detent freely and allows the print container to be removed completely from the camera. Each of the elements 36 is provided with one of the indentions 48 located adjacent to an opposite one of the sides 19. This permits the container to be mounted on the tracks 48 at either open end of the slots of elements 36 and permit functioning of the detent with respect to one of the indentions. It is, of course, conceivable, though less preferred, that the locations of the detent 42 and indentions 48 could be interchanged, that is, the detents could be located on elements 36 and the indentions formed in elements 38.

Figure 3:
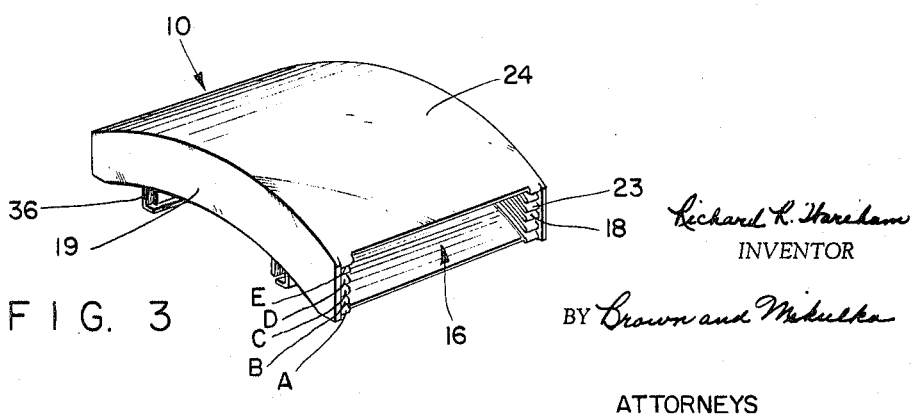
FIG. 3 is a diagrammatic perspective view of the print container removed from its mounting plate and showing its structure in greater detail.

The arrangement and depth of the channels 18 are predeterminedly chosen with respect to the most effective use and storage capacity of the print container. Thus, each of the four uppermost functional pairs of channels has a depth, taken in a direction at 90° to the bearing surfaces of the shoulders 23, which is calculated to accept a single processed print and provide a clearance enabling it to be freely inserted or withdrawn. However, the lowest or fifth pair of channels has a depth which is considerably greater for a reason to be explained below. It has previously been stated that an objective is to position the last-processed print in the container so that it is continuously visible for reference relative to making the next exposure as, for example, to make corrections of camera settings. As shown in FIG. 3, the channels, commencing at the bottom, are designated A through E and are used in an effective storage system as follows, bearing in mind that all prints have a moist and probably tacky, although quick-drying, substance on their surfaces after processing. Assuming, for example, an eight-exposure film the following order of arrangement, after exposure and processing, is possible by means of the structure just described. The first processed print is placed so that its margins are held in channels B at opposite sides of the container; the second in channels C; the third in D; and the fourth in E. All of the prints are then placed, in stacked relation, in the lower and wider pair of channel A with the last-processed print on top, it being assumed that at least the first three prints are sufficiently dry. The next frame of film is then exposed and processed and the fifth processed print is placed in channels B; the sixth in C; the seventh in D; and the eighth in E, after which, assuming the eight-exposure roll, all of the prints may be removed, if desired, and stored elsewhere.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A generally rectangular, shallow containing device for receiving and protectively storing a plurality of recently processed photographic prints in a given order of arrangement and visibility, each print, following its processing, having an image-bearing surface which is in a moist and somewhat tacky condition and therefore requires freedom from contact with any other surface until thoroughly dry, said containing device comprising a generally rectangular bowed lower wall member, a generally rectangular transparent upper wall member bowed similarly to said lower wall member, a pair of curved side wall members of a height which is small relative to their length and provides said shallow dimension of the device, the curve of said side wall members conforming to the bow of said lower and upper wall members, a plurality of curved, spaced, narrow, elongated, and parallel shoulders integral with and extending along substantially the entire length of the inner face of each of said side wall members so as to form therebetween a plurality of curved similarly-extending channels, the channels which are located on side wall members laterally directly opposite each other being adapted to slidably receive the marginal areas only of said prints and maintain the image areas entirely free from contact with any surface, the two relatively adjacent shoulders of each side wall member nearest to said lower wall member being spaced apart farther than other relatively adjacent shoulders to provide a wider bottom channel at each side wall member than other channels located at higher levels, the pair of oppositely-located wider channels thus provided being adapted to accept and hold a plurality of said prints in superimposed stacked relation when they have been removed from said other channels after their image-bearing surfaces are dry, and closure means blocking said channels at an end of said device opposite to that at which said prints are received so as to constitute a limit stop controlling the maximum insertion of each print, the length of said channels being such as to permit a tab portion of the print to be accessible exteriorly of the container for use in inserting and removing said print, the area between said lower and upper wall members and the shoulders of said side wall members being substantially devoid of structure and therefore largely open at both ends so as to form a pair of relatively large apertures which induce a flow of air through the print-containing device and over the surface of prints contained therein to facilitate the drying of each said moist and tacky print surface.

2. In combination with a plate-like mounting bracket for attachment to a camera, said bracket having a pair of parallel, elongated, slidably-engageable track members extending along two sides thereof, a generally rectangular, shallow containing device for receiving and protectively storing a plurality of recently processed photographic prints in a given order of arrangement and visibility, each print, following its processing, having an image-bearing surface which is in a moist and somewhat tacky condition and therefore requires freedom from contact with any other surface until thoroughly dry, said containing device comprising a generally rectangular bowed lower wall member, a generally rectangular transparent upper wall member bowed similarly to said lower wall member, a pair of curved side wall members of a height appreciably less than their length, the curve of said side wall members conforming to the bow of said lower and upper wall members, a plurality of curved, spaced, narrow, elongated and parallel shoulders integral with and extending along substantially the entire length of the inner face of each of said side wall members so as to form therebetween a plurality of curved similarly extending channels, the channels which are located on side wall members laterally directly opposite each other being adapted to slidably receive the marginal areas only of said prints and maintain the image areas entirely free from contact with any surface, closure means blocking said channels at an end of said containing device opposite to that at which said prints are received so as to constitute a limit stop controlling the maximum insertion of each print, the length of said channels being such as to permit tab of the print to be accessible exteriorly of the containing device for use in inserting and removing said print, the area between said lower and upper wall members and the shoulders of said side wall members being substantially devoid of structure and therefore largely open at both ends so as to form a pair of relatively large apertures which induce a flow of air through the containing device and over the surfaces of prints containing therein to facilitate the drying of each said moist and tacky print surface, and means integral with said containing device forming a pair of raised, elongated elements extending across said lower wall member in a direction substantially at 90° to said bow thereof for slidably engaging said engageable members of said mounting bracket so as to permit slidable movement of said containing device on said bracket in a direction generally parallel to a surface of said camera.

3. A print-containing device, as defined in claim 2, wherein said pair of raised elongated elements extends in a direction substantially at 90° to that of said shoulders and channels.

4. A print-containing device, as defined in claim 2, wherein said slidably-engageable members of said bracket comprise a pair of protruding flange members, and wherein said means integral with said containing device for slidably engaging said members comprise a pair of elongated slotted elements.

5. A print-containing device, as defined in claim 4, wherein limit stop means is incorporated with said elongated slotted elements of said containing device and said flange members of said mounting bracket to control the limit of slidable movement of said containing device on said bracket.

6. A print-containing device, as defined in claim 5, wherein said limit stop means comprises a spring-like element attached to and having a tip normally protruding from said mounting bracket and biased toward an indention for receiving said tip at a given position of the containing device on the mounting bracket, said indention being formed in a member comprised by said slotted elements of the lower wall member.

7. In combination with a camera including a mounting bracket having parallel, elongated, slidably-engageable track means extending along two opposite sides, a generally rectangular shallow containing device for receiving and protectively storing a plurality of recently processed photographic prints in a given order of arrangement and visibility, each print, following its processing, having an image-bearing surface which is in a moist and somewhat tacky condition and therefore requires freedom from contact with any other surface until thoroughly dry, said containing device comprising a generally rectangular bowed lower wall member, a generally rectangular transparent similarly bowed upper wall member, a pair of edge-curved side wall members of a height which is small relative to their length and provides said shallow dimension of the device, a plurality of curved spaced, narrow, elongated and parallel shoulders integral with and extending horizontally along substantially the entire length of the inner face of each of said side wall members so as to form therebetween a plurality of curved similarly extending channels, said bowed and curved wall members and said channels having a similar radius of curvature, the channels which are located on side wall members laterally directly opposite each other being adapted to slidably receive the marginal areas only of said prints and maintain the image areas entirely free from contact with any surface, closure means blocking said channels at an end of said device opposite to that at which said prints are received so as to constitute a limit stop controlling the maxium insertion of each print, the length of said channels being such as to permit a tab portion of the print to be accessible exteriorly of the container for use in inserting and removing said print, the area between said lower and upper wall members and the shoulders of said side wall members being substantially devoid of structure and therefore largely open at both ends so as to form a pair of relatively large apertures which permit a flow of air through the print-containing device and over the surfaces of prints contained therein to facilitate the drying of each said moist and tacky print surface, and means integral with said print-containing device forming a pair of raised elongated, slotted elements extending across said lower wall member of slidably engaging said engageable track means of said bracket to permit said print-containing device to be moved to a plurality of positions with respect to a face of said camera.

8. A print-containing device, as defined in claim 7, wherein said device is slidably movable on said bracket means in a direction at 90° to the bow and curve of said walls and to a degree permitted by mutually operative limit stop means comprising in part by said camera, bracket and print-containing device, slidable movement in one direction providing accessibility of the camera finder for making an exposure, and in an opposite direction providing accessibility of latching means enabling removal of a processed print from said camera.

9. In combination with a camera, a curved container slidably and detachably mounted thereon for movement at 90° to the curve of said container, said container being suitable for storing photographic prints produced in said camera and comprising mounting means slidably engaging cooperating engageable means of said camera so as to permit manually induced movement of said container across a surface of said camera to various positions for uncovering and rendering accessible control means of said camera to obtain utmost convenience in exposure and processing manipulation of said camera, and limit stop means establishing the limits of said movement of said container across said camera surface, said limit stop means comprising mutually engageable means consisting of a pivotal projecting element and means forming an indention, one of which is embodied in an element of said container and the other in an element identified with said camera.

10. In combination with a camera, a container slidably and detachably mounted thereon, as defined in claim 9, wherein said limit stop means comprises cooperating means embodied in said flange and channel means, respectively.

11. In combination with a camera, a container slidably and detachably mounted thereon, as defined in claim 10, wherein said projecting element is incorporated with said flange and said indention means is embodied in said channel means.

12. In combination with a camera, a container slidably and detachably mounted thereon, as defined in claim 9, wherein said projecting element is a spring-like member biased toward said engageable means comprising said indention and having an elasticity such that at speeds of slidable movement of said container in a given direction and up to and including a given maximum speed it is capable of entering said indention to hold said container against further movement, but at speeds in excess of said maximum speed it is incapable of entering said indention, due to inertia of said spring-like member, so that said container is capable of continued movement in said direction and is removable from said camera.

References Cited by the Examiner
UNITED STATES PATENTS

| 211,957 | 2/1879 | Blair | 95—13 |
| 1,234,641 | 7/1917 | Dickson | 95—98 |
| 2,791,950 | 5/1957 | Oppenheimer | 95—86 |

JOHN M. HORAN, *Primary Examiner.*

NORTON ANSHER, *Examiner.*